(12) United States Patent
Ahlisch

(10) Patent No.: US 12,357,853 B2
(45) Date of Patent: Jul. 15, 2025

(54) FIRE-RESISTANT CASING FOR A MEMBER

(71) Applicant: Walter Ahlisch, Edmonton (CA)

(72) Inventor: Walter Ahlisch, Edmonton (CA)

(73) Assignee: Flame Cap Ltd., Edmonton (CA)

( * ) Notice: Subject to any disclaimer, the term of this patent is extended or adjusted under 35 U.S.C. 154(b) by 351 days.

(21) Appl. No.: 16/584,757

(22) Filed: Sep. 26, 2019

(65) Prior Publication Data

US 2020/0101332 A1 Apr. 2, 2020

Related U.S. Application Data

(60) Provisional application No. 62/736,796, filed on Sep. 26, 2018.

(51) Int. Cl.
*A62C 2/06* (2006.01)
*F16L 5/04* (2006.01)

(52) U.S. Cl.
CPC .............. *A62C 2/065* (2013.01); *F16L 5/04* (2013.01)

(58) Field of Classification Search
CPC .. A62C 2/065; A62C 2/06; A62C 3/16; A62C 35/00; F16L 5/04; F16L 57/04; H02G 3/0412; H02G 3/04; B29C 39/00; B29C 39/003
USPC .......................................................... 169/48
See application file for complete search history.

(56) References Cited

U.S. PATENT DOCUMENTS

| | | |
|---|---|---|
| 576,899 A | 2/1897 | Scott |
| 4,109,423 A | 8/1978 | Perrain |
| 5,058,341 A * | 10/1991 | Harbeke, Jr. .......... A62C 2/065 52/317 |
| 5,103,609 A | 4/1992 | Thoreson et al. |
| 6,477,813 B2 | 11/2002 | Andresen |
| 6,643,985 B2 | 11/2003 | Munzenberger |
| 7,521,495 B2 | 4/2009 | Horacek et al. |
| 9,220,932 B2 | 12/2015 | Zernach et al. |
| 9,833,646 B2 | 12/2017 | Forg et al. |
| 2009/0326117 A1 | 12/2009 | Benussi et al. |
| 2010/0266788 A1* | 10/2010 | Niccolls ................ B32B 15/14 428/447 |
| 2011/0018206 A1* | 1/2011 | Beele ..................... F16L 5/04 277/606 |
| 2015/0251028 A1* | 9/2015 | Klein .................... A62C 2/065 277/616 |

(Continued)

FOREIGN PATENT DOCUMENTS

| | | |
|---|---|---|
| CA | 3056851 | 3/2020 |
| CN | 101067465 | 11/2007 |

(Continued)

*Primary Examiner* — Arthur O. Hall
*Assistant Examiner* — Juan C Barrera
(74) *Attorney, Agent, or Firm* — Bennett Jones LLP

(57) ABSTRACT

In order to provide passive fire protection for a member, casing portions that are physically discrete from each other and from the member are made by injection molding of fluid fire-resistant material (which may be intumescent), and allowing the material to cure. The inner surfaces of the casing portions are complementary in shape to a portion of the outer surface of the member. The casing portions collectively form a casing that surrounds the outer surface of the member, with their inner surfaces abutting against the outer surface of the member. The casing portions are secured to the member by a removable strap or collar, an adhesive, or both.

14 Claims, 2 Drawing Sheets

(56) References Cited

U.S. PATENT DOCUMENTS

2016/0236019 A1* 8/2016 Fyfe ................... B32B 27/065
2016/0332345 A1* 11/2016 Muenzenberger ..........................
                                                          B29C 49/0005
2018/0306352 A1* 10/2018 Albers ................... A62C 2/065

FOREIGN PATENT DOCUMENTS

| DE | 202005012876 | 10/2005 |
|----|--------------|---------|
| EP | 0635665 | 3/1997 |
| WO | 2016202681 | 12/2016 |

* cited by examiner

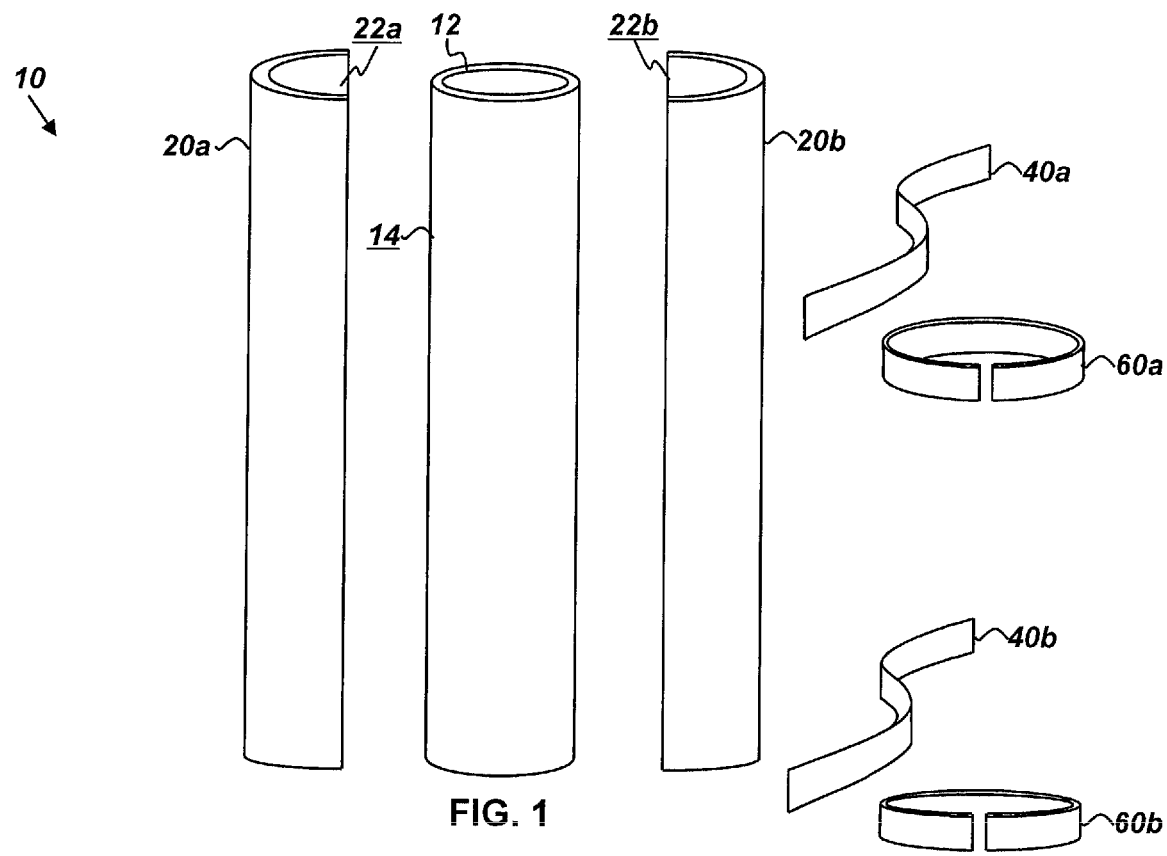
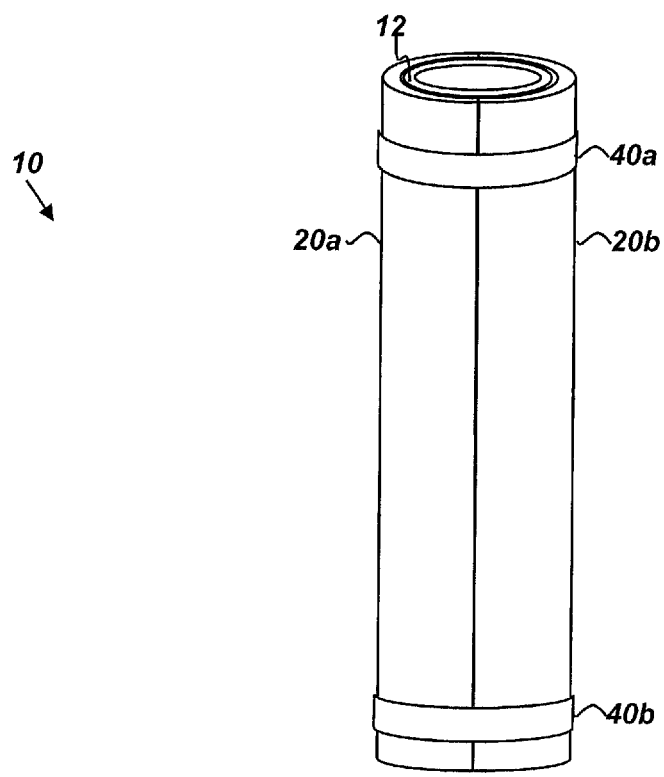
FIG. 1
FIG. 2

FIRE-RESISTANT CASING FOR A MEMBER

FIELD OF THE INVENTION

The present invention relates to passive fire protection for a member, and more particularly to a fire-resistant casing for a member, a method of producing such a casing, and systems and methods that include such a casing.

BACKGROUND OF THE INVENTION

Fire-resistant intumescent materials are sprayed-coated in fluid form onto members such as metal I-beams, pipes, and poles to provide passive fire protection for them. However, spray-coating of the intumescent material may result in an "orange peel" surface finish. To achieve a smoother finish, the intumescent material can be "back rolled" while still wet, or a top seal coat can be applied, but this requires more work. Full curing of each spray-coat of intumescent material may take several hours or even days, during which time application of additional coats, and handling of the member should be avoided. Spray-coating requires skilled application and careful inspection to ensure proper adhesion of a uniform desired thickness of the intumescent material on the member. During the spray-coating process, applicators must wear safety equipment to prevent exposure to aerosolized intumescent material. Spray-coated intumescent material cannot be easily removed for repair or refinishing, or where only temporary protection is desired. Accordingly, there is a need for alternative ways of providing passive fire protection for members.

SUMMARY OF THE INVENTION

In one aspect, the present invention comprises a casing portion for providing passive fire protection for a member, wherein the casing portion is physically discrete from the member. The casing portion comprises a cured fluid fire-resistant material. The casing portion comprises an inner surface for abutting against a portion of an outer surface of the member. The inner surface of the casing portion is complementary in shape to the portion of the outer surface of the member. In one embodiment of the casing portion, the fire-resistant material is intumescent.

In another aspect, the present invention comprises a method of forming a casing portion for providing passive fire resistance for a member. The method comprises the steps of:
  (a) placing a fluid fire-resistant material into a mold defining a shape of the casing portion comprising an inner surface for abutting against a portion of an outer surface of the member, wherein the inner surface of the casing portion is complementary in shape to the portion of the outer surface of the member;
  (b) allowing the fluid fire-resistant material to cure in the mold so that the fire-resistant material retains the shape of the casing portion when removed from the mold; and
  (c) removing the cured fire-resistant material from the mold.

In one embodiment of the method of forming the casing portion, the fire-resistant material is intumescent.

In another aspect, the present invention comprises a system for providing passive fire protection for a member. The system comprises a plurality of casing portions physically discrete from each other and from the member. The casing portions comprise a fire-resistant material. Each of the casing portions comprises an inner surface for abutting against a portion of an outer surface of the member. The inner surface of the casing portion is complementary in shape to the portion of the outer surface of the member. The system further comprises a means for securing the casing portions to the member, with the inner surfaces of the casing portions abutting against the outer surface of the member, and the casing portions collectively forming a casing surrounding the outer surface of member. The means for securing may comprise at least one removable strap or collar for surrounding the casing portions, and compressing the inner surfaces of the casing portions against the outer surface of the member. In addition or in the alternative, the means for securing may comprise an adhesive material between the inner surfaces of the casing portions and the outer surface of the member. In one embodiment of the system, the fire-resistant material is intumescent. In one embodiment of the system, the adhesive material may comprise the fire-resistant material of the casing portions.

In another aspect, the present invention comprises a method for providing passive fire protection for a member. The method comprises the steps of:
  (a) providing a plurality of casing portions physically discrete from each other and from the member, wherein the casing portions comprise a fire-resistant material, and wherein each of the casing portions comprises an inner surface for abutting against a portion of an outer surface of the member, wherein the inner surface of the casing portion is complementary in shape to the portion of the outer surface of the member; and
  (b) securing the casing portions to the member, with the inner surfaces of the casing portions abutting against the outer surface of the member, and the casing portions collectively forming a casing surrounding the outer surface of the member.

In one embodiment of the method for providing passive fire protection for the member, the fire-resistant material is intumescent. In one embodiment of the method for providing passive fire protection for the member, securing the casing portions to the member comprises using at least one removable strap or collar for surrounding the casing portions and compressing the inner surfaces of the casing portions against the outer surface of the member. In one embodiment of the method for providing passive fire protection for the member, securing the casing portions to the member comprises using an adhesive material between the inner surfaces of the casing portions and the outer surface of the member. The adhesive material may comprise the fire-resistant material of the casing portions.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 1 shows a perspective view of an embodiment of the fire-resistant casing of the present invention prior to installation on a member in the form of a pipe.

FIG. 2 shows a perspective view of the fire-resistant casing of FIG. 1 after installation on the pipe.

DETAILED DESCRIPTION OF EMBODIMENTS OF THE INVENTION

Figure 3A:
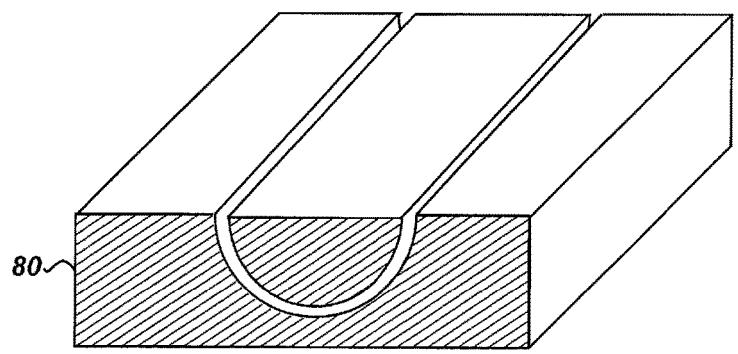
FIGS. 3a to 3c show steps in the formation of one of the casing portions of the fire-resistant casing of FIG. 1.

When describing the present invention, all terms not defined herein have their common art-recognized meanings. To the extent that the following description is of a specific embodiment or a particular use of the invention, it is intended to be illustrative only and not limiting of the claimed invention.

FIG. 1 shows a perspective view of an exemplary embodiment of a system (10) of the present invention prior to installation on a member in the form of a pipe (12) having a substantially cylindrical outer surface (14).

As non-limiting examples, the pipe (12) may be used to convey fluids, or as a member of a larger structure. The system (10) of the present invention may be used with a solid pole instead of a tubular pipe. "Pipe" or "pole", as used herein, refers to any member having a substantially cylindrical outer surface, where the length of the member defines a "longitudinal" direction of the member, and the substantially circular cross-section of the member defines a "transverse" direction of the member. The present invention is not limited by any particular shape or size of the member, its constituent material, its use, or its orientation. For example, the present invention can be adapted for use with a member having complex geometries known in the art of building construction, including without limitation members having cross-sections that are substantially H-shaped or I-shaped, T-shaped, C-shaped, L-shaped, rectangular-shaped, or square-shaped, whether solid or hollow.

In this embodiment, the system (10) includes two casing portions (20a, 20b), and a pair of straps (40a, 40b) or a pair of collars (60a, 60b).

In the embodiment shown in FIG. 1, the casing portions (20a, 20b) are made of a cured fire-resistant material. "Cure", "cured", "curing" and like terms, as used herein, describes a process whereby a material has transitioned from a fluid form that adopts the shape of its container, to a form that retains its shape in the absence of a container. "Fire-resistant material", as used herein, refers to any material that is designed to resist burning when exposed to heat. In some embodiments, the fire-resistant material may be intumescent. "Intumescent", as used herein, refers to the material expanding in volume and decreasing in density when exposed to heat. In other embodiments, the fire-resistant material may not be intumescent.

In the embodiment shown in FIG. 1, the casing portions (20a, 20b) collectively form a casing with a cylindrical inner surface that circumferentially surrounds and abuts against the outer surface of a pipe or a pole. Accordingly, the inner surface (22a, 22b) of each of the casing portions (20a, 20b) is complementary in shape to a portion of the outer surface (14) of the pipe (12). As used herein, "complementary in shape", means that the inner surface (22a, 22b) of the casing portion (20a, 20b) conforms to a portion of the outer surface (14) of the pipe (12) so that that they can be placed in abutting relationship with each other, with the interface between them free of any voids of substantial size relative to the size of pipe (12). In other words, the inner surface (22a, 22b) is a negative relief of a portion the outer surface (14). In the embodiment shown in FIG. 1, the casing portions (20a, 20b) are substantially identical and each has a half-tube shape defining a semi-cylindrical inner surface (22a, 22b). The diameter of the inner semi-cylindrical surfaces (22a, 22b) closely matches the diameter of the cylindrical outer surface (14) of the pipe (12). The diameter of the outer semi-cylindrical surface of the casing portions (20a, 20b) is dictated by the required thickness of the casing portions (20a, 20b), which depends on factors such as the desired fire protection to be provided by the casing portions (20a, 20b) and the fire-resisting properties of the material. As a non-limiting example, the thickness of the casing portions (20a, 20b) (i.e., the transverse dimension between the outer and inner semi-cylindrical surfaces) may be in the range of about 2 mm to about 20 mm. In other embodiments, the system (10) may have three or more casing portions, the casing portions may be non-identical to each other, the inner surface of the casing portions may not be cylindrical, and the outer surface of the casing portions may not be cylindrical. For a pipe or pole of a given diameter, the use of a larger number of equally-sized casing portions allows each of the casing portions to be smaller and lighter in weight, which may be more convenient for manufacturing, transport, and handling of the casing portions, particularly as their size increases.

In the embodiment shown in FIG. 1, the straps (40a, 40b) or collars (60a, 60b) are used to removably secure the casing portions (20a, 20b) to the pipe (12). As non-limiting examples, the straps (40a, 40b) may be made of a flexible textile material, and the collars (60a, 60b) may be made of a rigid but pliable metal material. It may be desirable for the straps (40a, 40b) or collars (60a, 60b) to have a level of fire-resistance that is at least comparable to that of the casing portions (20a, 20b) to ensure that the straps (40a, 40b) or collars (60a, 60b) will continue to secure the casing portions (20a, 20b) to the pipe (12) when exposed to heat. Where the straps (40a, 40b) or collars (60a, 60b) have detached ends such as shown in FIG. 1, those ends may be removably secured together using a variety of types of fastening mechanisms, such as a buckle or a ring (in the case of a strap), or a clip or screws (in the case of a collar). In other embodiments, the system (10) may require a fewer or greater number straps or collars, depending on factors such as the magnitude of compressive force applied by the straps or collars to the casing portions, and the length of the casing portions.

FIG. 2 shows a perspective view of the system shown in FIG. 1, after installation on the pipe (12).

The system (10) may be installed on the pipe (12) "in shop" before the pipe (12) is incorporated into a structure, or "on site" where the pipe (12) already forms part of a structure. To install the system (10) on the pipe (12), the semi-cylindrical inner surfaces (22a, 22b) of the casing portions (20a, 20b) are placed in abutting relationship with the outer cylindrical surface of the pipe (12), so that the casing portions (20a, 20b) collectively form a casing that circumferentially surrounds the pipe (12). Next, the straps (40a, 40b) or collars (60a, 60b) are placed circumferentially around the casing portions (20a, 20b) at longitudinally spaced-apart locations. The detached ends of each of the straps (40a, 40b) or collars (60a, 60b) are brought together and fastened so that the straps (40a, 40b) or collars (60a, 60b) apply a transversely acting compressive force that biases inner surfaces (22a, 22b) of the casing portions (20a, 20b) against the outer surface of the pipe (12) to resist movement of the casing portions (20a, 20b) relative to the pipe (12). This method of securing the casing portions onto the pipe may be less labor intensive, require less skill, and require less time than spray-coating of fire-resistant intumescent materials onto the pipe. Further, the straps or collars may be removed to allow the casing portions to be removed from the pipe, and possibly re-used. This makes the present invention particularly suitable when only temporary fire protection is needed for the pipe.

In other embodiments, the casing portions (20a, 20b) may be secured to the pipe (12) by alternative or additional means. In one embodiment, the means for securing may comprise an adhesive that adheres the inner surfaces (22a, 22b) of the casing portions (20a, 20b) to the outer surface (14) of the pipe (12). As a non-limiting example, an intumescent epoxy material that is used to make the casing portions (20a, 20b) may be applied (e.g., by spraying, dipping, or brushing) onto the inner surfaces (22a, 22b) of the casing portions (20a, 20b), or the outer surface (14) of the pipe (12), or both. Before the adhesive material has cured, the straps (40a, 40b) or collars (60a, 60b) may be used to secure the casing portions (20a, 20b) to the pipe (12). Once the adhesive material has cured sufficiently to secure the casing portions (20a, 20b) to the pipe (12), then the straps (40a, 40b) or collars (60a, 60b) may be removed.

Figure 3B:
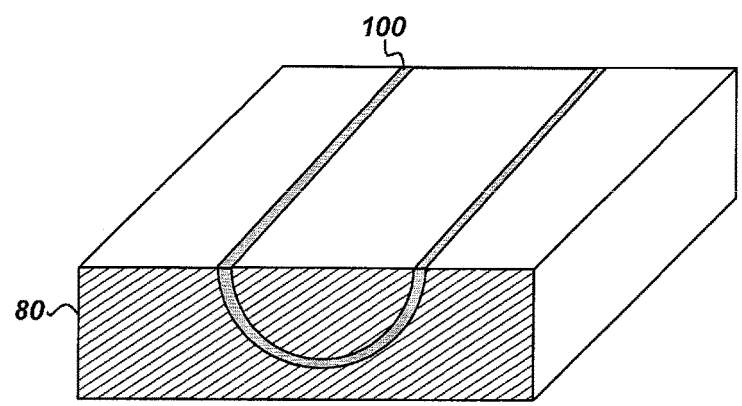
Figure 3C:
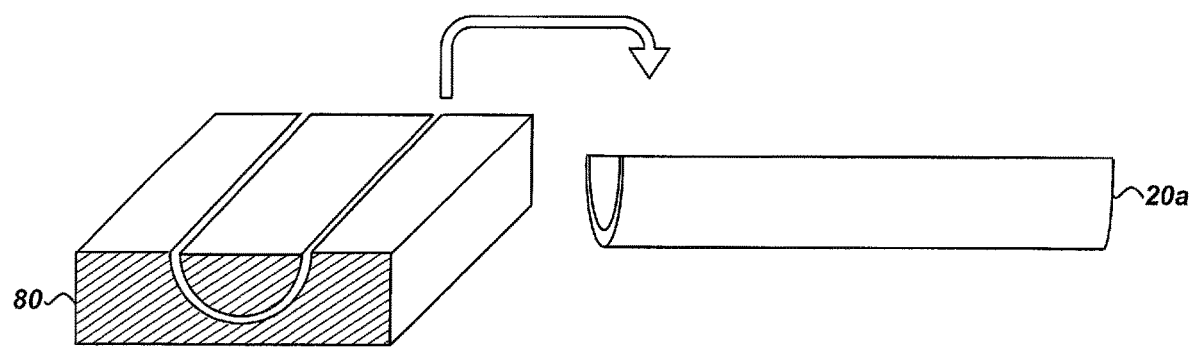

The casing portions (20a, 20b) may be formed by molding. Molding of fluid fire-resistant material (100) to form the casing portions (20a, 20b) may allow for superior control over their surface finish and thickness, than may be achieved for coatings of fire-resistant material that are spray-coated onto pipes or poles. As a non-limiting example, FIGS. 3a to 3c shows steps in the formation of one of the casing portions (20a) in the system (10) of FIG. 1. In FIG. 3a, a mold (80) that defines the half-tube shape of the casing portion (20a) is provided.

As noted above, the present invention may be adapted for use with members having different geometries, including without limitation members having cross-sections that are substantially H-shaped or I-shaped, T-shaped, C-shaped, L-shaped, rectangular-shaped, square-shaped, whether solid or hollow. In such embodiments, it is within the skill of persons ordinary skill in the art of molding to adapt the shape of the mold and select the number of the mold's constituent parts to produce casing portions having inner surfaces that are complementary in shape to a portion of the outer surface of such members.

In FIG. 3b, a fluid fire-resistant intumescent material (100) is placed into the mold (80).

This may be performed by injection molding techniques as known to persons skilled in that art. As a non-limiting example, a suitable fluid fire-resistant intumescent material (100) may comprise a two-part epoxy composition such as International Chartek 1709 ™ (AkzoNobel, Amsterdam, Netherlands). In other embodiments, the fluid fire-resistant intumescent material (100) may comprise other compositions. A variety of fire-resistant intumescent epoxy materials are known in the art and may be suitable for use in present invention, provided that the material undergoes curing to retain the shape of the mold (80) when removed from the mold (80). The fluid fire-resistant intumescent material (100) is allowed to cure in the mold (80) so that the fire-resistant intumescent material retains the half-tube shape of the mold (80) when removed from the mold (80). The required amount of curing time will depend on the particular composition of the fire-resistant intumescent material, and the ambient conditions of temperature and humidity under which the curing takes place. In FIG. 3c, the cured fire-resistant intumescent material is removed from the mold (80), and ready for use as a casing portion (20a).

Interpretation. Any term or expression not expressly defined herein shall have its commonly accepted definition understood by a person skilled in the art.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A method for providing passive fire protection for a member, the method comprising the steps of:
   (a) providing a plurality of casing portions physically discrete from each other and from the member, wherein the entirety of the structure that makes up the casing portions comprises a fire-resistant intumescent epoxy material which is cured, and wherein each of the casing portions comprises an inner surface for abutting against a portion of an outer surface of the member; and
   (b) securing the casing portions to the member, with the inner surfaces of the casing portions abutting against the outer surface of the member, and the casing portions abutting each other to collectively form an elongated casing surrounding the outer surface of the member, wherein the outer surface, of the member, has a cross-sectional shape, the elongated casing comprises a respective inner surface having a shape complementary to the cross-sectional shape; and wherein the member has a length dimension, and the elongated casing has a length at least equal to the length dimension.

2. The method of claim 1, wherein securing the casing portions to the member comprises using at least one removable strap or collar for surrounding the casing portions and compressing the inner surfaces of the casing portions against the outer surface of the member.

3. The method of claim 2, wherein the at least one removable strap or collar are formed of fire-resistant material.

4. The method of claim 2, wherein the at least one removable strap or collar comprises two or more removable straps or collars placed around the casing portions at longitudinally spaced-apart locations.

5. The method of claim 2, wherein the at least one removable strap or collar applies a transversely acting compressive force that biases the inner surface of each casing portion against the outer surface of the member to resist movement of the casing portion relative to the member.

6. The method of claim 2, further comprising:
   un-securing the casing portions to the member, and removing the casing portions from around the member.

7. The method of claim 1, wherein securing the casing portions to the member comprises using an adhesive material between the inner surfaces of the casing portions and the outer surface of the member.

8. The method of claim 7, wherein the adhesive material comprises the fire-resistant material of the casing portions.

9. The method of claim 1, wherein the cross-sectional shape is one of an H-shape, I-shape, T-shape, C-shape, L-shape, rectangular-shape and square-shape.

10. The method of claim 1, wherein the plurality of casing portions are of equal size.

11. The method of claim 1, wherein the member has an outer diameter dimension, and the elongated casing inner surface has an equal diameter dimension.

12. The method of claim 1, wherein the plurality of casing portions comprise three or more casing portions.

13. The method of claim 1, wherein each of the plurality of casing portions has an inner surface defining a semi-cylindrical surface.

14. The method of claim 1, wherein the elongated casing has an inner surface defining a negative relief of the cross-sectional shape of the outer surface of the member.

* * * * *